Feb. 5, 1963 J. W. HURON 3,076,627
VACUUM SENSITIVE ELECTRIC CONTROL WITH MOUNTING BRACKET
Filed June 10, 1960
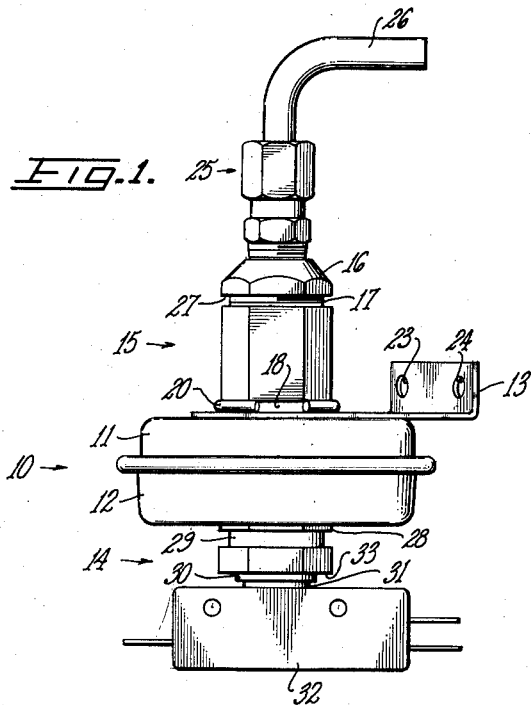
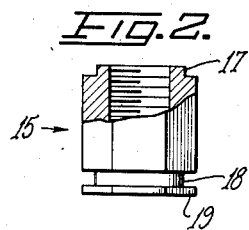
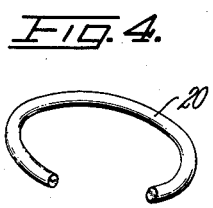
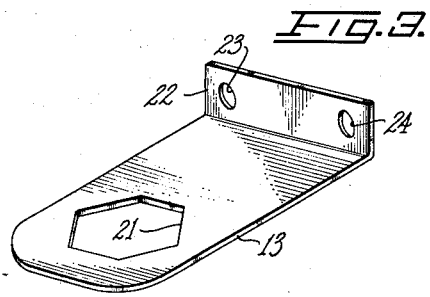
INVENTOR.
JAMES W. HURON
BY
—ATTORNEY—

United States Patent Office 3,076,627
Patented Feb. 5, 1963

3,076,627
VACUUM SENSITIVE ELECTRIC CONTROL WITH MOUNTING BRACKET
James W. Huron, 8010 Osage Ave., Los Angeles, Calif.
Filed June 10, 1960, Ser. No. 35,276
4 Claims. (Cl. 248—309)

This application is a continuation in part of my pending application S.N. 579,692, filed April 20, 1956, for Automatic Starter for Internal Combustion Engines, now Patent No. 3,041,463.

This invention relates to a vacuum sensitive electric control having a detachable mounting bracket, and a means of affixing the detachable mounting bracket onto the vacuum sensitive electric control in a varied number of mounting positions at time of installation.

The multiple choice of mounting positions for a vacuum sensitive electric control where it is to be used primarily on internal combustion engines having electric solenoid starting devices, is most desirable where installation has to be made in such areas as on a firewall, a fenderwell, or adjoining engine support, as is frequently the case and in these instances the multiple choice of positioning the device in relation to its mounting bracket becomes a matter of extreme installation importance.

In such installations the device has to be positioned in close proximity to the engine, for it requires a positive vacuum connection to the engine intake manifold and electrically is wired into the starter electrical system and becomes an integral part of the engine operation in that the engine vacuum controls its operation and governs its action in relation to its electrical influence on the starting system of the engine and since it is normally connected to the vacuum source by means of a hose it is desirable that it be mounted reasonably close for efficient operation.

The conditions of installation being greatly varied from one engine to another and in many instances the area allowable for mounting being congested, crowded and barely accessible it is often more convenient to attach the mounting bracket in the area selected for installation prior to assembling it to the unit and to position the unit on the mounted bracket after the bracket has been installed.

My invention has been made with the foregoing considerations in mind and can be said to have a plurality of important objects.

One important object of my invention is the provision of a detachable mounting bracket that can be readily affixed at time of installation and permits the choice of one of a variety of combinations on installation to achieve proper positioning of the vacuum sensitive electric control in relation to the engine it must service.

Another important object of my invention is the provision of a detachable mounting bracket that can be attached to a firewall, fenderwell or other desired mounting area prior to affixing it to the vacuum sensitive electric control device.

An additional important object of my invention is the provision of a means to position the device in relation to the mounting bracket while the mounting bracket is on the device, by means of moving the bracket into one of several circular grooves provided in my invention and in which the bracket can be freely rotated for purposes of alignment.

A further important object of my invention is the provision of a means to firmly affix the mounting bracket to the device and lock the bracket in position with a snap-ring whereby the mounting bracket is not free to move up or down or be rotated either clockwise or counter clockwise once it has been positioned and locked in place.

Another important object of my invention is the provision of a means to hold the snap-ring in fixed relationship with the mounting bracket which the snap-ring locks in rigid position on the vacuum sensitive electric control.

A still further important object of my invention is the provision for mounting the detached bracket to either the top or bottom of the vacuum sensitive electric control and locking the bracket rigidly in place by means of a snap-ring in either position.

An additional important object of my invention is the provision for removal of the electric switch for placing the mounting bracket on the bottom of the vacuum sensitive electric control and repositioning the electric switch after the bracket is on the bottom shank of the vacuum sensitive electric control.

In brief, my invention consists of a vacuum sensitive electric control device having top and bottom metal plates affixed to interiorly hollow metal hex shanks and a detachable metal mounting bracket having an interior hex cut-out area slightly greater than the hex shanks on which it can be positioned in a choice of any one of a variety of positions and by means of three circular grooves provided on the hex shanks, each of slightly greater width than the thickness of the metal mounting bracket. The bracket can be easily positioned on the hex shank and rotated freely while in the circular groove for alignment with the desired sides of the hex shank.

There are two circular grooves provided on the top hex shank, the topmost circular groove being provided for the bracket to be slipped past the metal hex nut interiorly threaded into the top of the top hex shank and eliminating the necessity of its sides having to be in alignment with the sides of the hex shank into which it is threaded and appears to be a part of when threaded tightly into place with only a fibre washer separating it from the top of the shank. This circular groove cut immediately beneath the hex nut not only eliminates the need of aligning the nut to the shank, it also provides an area in which the bracket can be rotated freely and positioned while on the hex shank.

The second circular groove cut on the top hex shank is a bracket thickness above the base of the shank and is provided primarily for the retention of the metal snap-ring that locks the bracket in a fixed position on the bottom most hexed area of the top shank and keeps the bracket from moving up while locking it against the metal top plate of the vacuum sensitive electric control in a fixed position. This second circular groove also provides an area in which the bracket can be rotated freely prior to being locked in a fixed position with the snap-ring.

The third circular groove is on the bottom hex shank and is a bracket thickness below the base of the shank and like the other groove cuts, is wide enough to allow the bracket to be rotated freely, but provided primarily for the retention of the metal snap-ring that locks the bracket in a fixed position on the topmost hexed area of the bottom shank and keeps the bracket from moving down while locking it against the metal bottom plate of the vacuum sensitive electric control in a fixed position, if it is desirable for convenient installation to mount the bracket on the lower hex shank.

The bottom hex shank is interiorly threaded to hold the threaded tubular metal shank of the electric switch which has a spring loaded actuator stem extending unattached within the bottom hex shank and can be unscrewed from this position to allow the mounting bracket to be placed on the bottom hex shank.

The mounting bracket is made of metal and of sufficient thickness to be quite rigid and wider than the hex shanks and long enough to extend past the widest part of the vacuum sensitive electric control when mounted on one of the hex shanks, and at one end has an interior hex cut-out area slightly greater than the hex shank to which it is mated and at the other end has a right angle bend with two holes so as that when the bracket is mounted on the shank the end farthest away from the shank is perpendicular and parallel to one of the hex sides of the shank on which it is mounted.

Other important objects of this invention will become apparent in the following detailed description of one embodiment thereof when read with reference to the accompanying drawings of which:

FIGURE 1 is a vertical view of the vacuum sensitive electric control with the mounting bracket affixed in place at the bottom of the top hex shank and firmly secured by the snap-ring.

FIGURE 2 is a cut-away view of the top hex shank showing in detail the interior threads provided for the top hex nut which threads interiorly into the top hex shank and the two circular groove cuts and bottom hex area provided for affixing in place the adjustable mounting bracket.

FIGURE 3 is a view of the mounting bracket detached from the vacuum sensitive electric control showing in detail the interior cut-out hex area and right angle bend provided with holes for metal screws to attach the bracket to a mounting surface.

FIGURE 4 is a plan view of the snap-ring detached from the vacuum sensitive electric control shown in FIGURE 1.

Reference is again made to FIGURE 1 in which the vacuum sensitive electric control constructed according to my invention is designated by the numeral 10 which will be used hereinafter to indicate the vacuum sensitive electric control including its top plate 11, bottom plate 12, bottom hex shank 14, top hex shank 15, hex nut 16, top assembly 25, and electric switch 32.

As has been previously indicated, the vacuum sensitive electric control 10, except for the electric switch 32, is formed of metal as is the mounting bracket 13 and the snap-ring 20 and for the sake of illustrative clarity are shown separately.

Again in FIGURE 1, the mounting bracket 13 is seen on the interiorly hollow top hex shank 15 having been moved past the hex nut 16 into the circular groove cut 17 clearly shown in FIGURE 2, where it was aligned prior to being moved down to the circular groove cut 18 and onto the bottom hex area 19 where it is firmly locked against the top plate 11 by the snap-ring 20 which has been pushed onto the circular groove cut 18 and is firmly retained therein.

Attention is directed to FIGURE 3 which shows the particular conformation of the mounting bracket 13 which is made of metal and at one end has an interior hex cut-out area 21, having a slightly greater inside diameter than the outside diameter of the hex nut 16, the top hex shank 15 and the bottom hex shank 14, so as to be moved freely up or down over these hexed parts and at a distance greater than the widest radius of the vacuum sensitive electric control 10 a right angle bend 22 sufficiently large in area to allow for two holes 23 and 24 that are provided to put metal screws through to attach the mounting bracket 13 to a mounting surface such as a firewall or fenderwell.

Particular attention is directed to FIGURE 4 which shows the conformation of the snap-ring 20 which is used to lock the mounting bracket 13 in one of a multiple number of positions on the vacuum sensitive electric control 10, the large cut-out area of the snap-ring 20 is provided so that it can be pushed into the circular groove cuts 18 and 29 without strain and being slightly more than semi-circular, with an inside diameter equal to the outside diameter of the circular groove cuts 18 and 29 when extended and in a retained position, on either of the groove cuts 18 or 29 and when so engaged the snap-ring 20 can be depended upon to stay secured and prevent the mounting bracket 13 from moving past it, the snap-ring 20 when so positioned having an outside diameter greater than the widest inside diameter of the interior hex cut-out area 21, of the mounting bracket 13.

Referring again to FIGURE 1, attention is directed to the top assembly 25 and the vacuum connection tube 26 that can be rotated and positioned at time of installation and is an integral part of the top assembly 25, which is threaded interiorly into the hex nut 16, which is threaded interiorly into the top hex shank 15 and separated by a thin fibre washer 27 which serves as a seal between the metal surface of the hex nut 16 and the top hex shank 15.

Still referring to FIGURE 1, attention is directed to the bottom hex shank 14 to which the mounting bracket 13 can also be affixed in one of a multiple number of positions in relation to the vacuum sensitive electric control 10 by putting the mounting bracket 13 on the bottom hex shank 14 and moving it to the topmost hex area 28 past the circular groove cut 29 into which the snap-ring 20 will be placed to hold the mounting bracket 13 firmly against the bottom plate 12, but to place the mounting bracket 13 on the bottom hex shank 14, it is first necessary to remove the electric switch 32 which has a threaded tubular shank 31 that is screwed into the hollow bottom hex shank 14 that is interiorly threaded 33 and separated from the electric switch 32 by a fibre washer 30 which serves to lock the threaded tubular shank 31 of the electric switch 32 in fixed relation with the bottom hex shank 14 and it is to be noted that within the threaded tubular shank 31 of the electric switch 32 is a spring loaded actuator stem extending upward within the interiorly hollow bottom hex shank 14 into the hollow interior area of the bottom plate 12 where it extends unattached and so permits the electric switch 32 of which it is part to be freely screwed out of the bottom hex shank 14, so as the mounting bracket 13 can be easily positioned on the bottom hex shank 14 and the threaded tubular shank 31 of the electric switch 32 screwed back into the bottom hex shank 14.

Reference is again made to FIGURE 2, which shows the top hex shank 15 in detail and particular attention is invited to the top circular groove cut 17 which is at the top-most part of the top hex shank 15 and cut only slightly deeper than the thinnest walled section of the top hex shank 15 and cut to a slightly greater width than the thickness of the metal used in the mounting bracket 13 so as that when the hex cut-out area 21 of the mounting bracket 13 is in the circular groove cut 17 the mounting bracket 13 can be rotated freely and positioned on the desired hexed area of the top hex shank 15 prior to being moved to the bottom circular groove cut 18 which though provided primarily for the retention of the snap-ring 20, is a replica of the top circular groove cut 17 and is positioned the thickness of the metal used in the mounting bracket 13 from the base of the top hex shank 15 so as to provide the bottom hex area 19 which the interior hex cut-out area 21 of the mounting bracket 13 is mated to and on which area it can not be rotated and is prevented from moving down by the top plate 11 which it is pressed flat against when the snap-ring 20 is positioned in the circular groove cut 19, locking the mounting bracket 13 firmly in place on the bottom hex area 19.

Attention is directed to the fact that the bottom hex shank 14 is constructed substantially the same as the top hex shank 15 with the circular groove cut 29 being a replica of the circular groove cuts 17 and 18 in size and depth and positioned the thickness of the metal used in the mounting bracket 13 from the base of the bottom hex shank 14 to provide the hex area 28 which the interior hex cut-out area 21 of the mounting bracket 13 is mated to and on which the mounting bracket 13 is not free to be rotated and is prevented from moving up by the bottom plate 12 against which the mounting bracket 13 is pressed flat against when the snap-ring 20 is positioned in the circular groove cut 29, locking the mounting bracket 13 firmly in place in its selected position on the hex area 28 of the bottom hex shank 14.

Attention is directed to the fact that the top circular groove cut 17 on the top hex shank 15 allows the mounting bracket 13 to be slipped past the hex nut 16 with the sides of the hex nut 16 out of alignment with the sides of the top hex shank 15 into which the hex nut 16 is interiorly threaded and appears to be a part of when threaded tightly into place and as has been previously indicated the mounting bracket 13 can be freely rotated in the circular groove cuts 17, 18, and 29 and affixed in six different positions on the hex area 19 of the top shank 15 while on the vacuum sensitive electric control 10 and affixed in six different positions on the hex area 28 of the bottom hex shank 14 while on the vacuum sensitive electric control 10 and it is significant to note that the sides of the top hex shank 15 are not necessarily in perpendicular alignment with the sides of the bottom hex shank 14 so the choice of the six different positions on the top hex shank 15 are not duplicated by the six different available mounting positions on the lower hex shank 14 and a truly multiple choice of positions are available at the time of affixing the mounting bracket 13 to the vacuum sensitive electric control 10.

Attention is further directed to the fact that the top hex shank 15 is permanently and rigidly attached at time of manufacture to the top plate 11 and the bottom shank 14 is permanently and rigidly attached to the bottom plate 12 and that the top plate 11 is permanently and rigidly attached to the bottom plate 12 by means of a metal flange around the outside edge of the widest part of the vacuum sensitive electric control 10 and interiorly the top plate 11 and bottom plate 12 are separated one from another by a flexible diaphragm, that is depressed by a spring interiorly positioned in the hollow top hex shank 15 and secured against the bottom of the hex nut 16 extending the diaphragm so as in a depressed position the bottom side contacts and causes to be depressed the spring loaded actuator stem of the electric switch 32 which is positioned by the threaded tubular shank 31 interiorly threaded 33 into the bottom hex shank 14 and although the basic operation and electric wiring installation of the vacuum sensitive electric control 10 is not part of this patent application, it is important that the basic construction of the vacuum sensitive electric control 10 as it relates to the mounting bracket 13, be clearly understood.

Although in order to comply with the statute my invention has been set forth in considerable detail concerning one particular embodiment, it is to be understood that these details are subject to change and modification and the embodiment is open to substantial variation, the invention itself is amenable to adaptation into a plurality of embodiments and therefore is not to be restricted to the form specified herein nor limited in any manner except as may be indicated by the extent of the appended claims,

What I claim as my invention and wish to secure by United States Letters Patent is:

1. In a vacuum-sensitive electric control device, in combination: a vacuum sensitive unit including a top cover; a tubular top shank, of polygonal external cross section, having a bottom flange of polygonal periphery and of sheet metal thickness, secured to said top cover with said polygonal periphery projecting beyond said top cover, said tubular top shank having an annular snap ring groove immediately adjacent said flange; and a bracket of angle form and of formed sheet metal structure comprising a flat body plate provided with a polygonal opening of slightly greater diameter than the external diameter of said flange, said body plate being seated against said top cover with said flange disposed in said opening and non-rotatably coupled to the polygonal periphery thereof, said body plate having an outer end portion projecting beyond the diameter of said top cover and terminating in a mounting tab bent at right angles to said body plate; and a snap ring engaged in said annular groove and bearing against the outer face of said body plate to detachably secure said bracket in its seated engagement with said top cover.

2. A control device as defined in claim 1, wherein said polygonal periphery and opening are hexagonal.

3. A control device as defined in claim 2, wherein is provided a bottom shank with a polygonal flange and adjoining snap-ring groove similar to those of said top shank, whereby said bracket can be selectively coupled to said bottom shank in the same manner as to said top shank.

4. In a vacuum-sensitive electric control device, in combination: a vacuum sensitive unit including a top cover; a tubular top shank, of polygonal external cross section, having a bottom flange of polygonal periphery and of sheet metal thickness, secured to said top cover with said polygonal periphery projecting beyond said top cover, said tubular top shank having an annular snap ring groove immediately adjacent said flange; and a bracket of formed sheet metal structure comprising a flat body plate provided with a polygonal opening of slightly greater diameter than the external diameter of said flange, said body plate being seated against said top cover with said flange disposed in said opening and non-rotatably coupled to the polygonal periphery thereof, said body plate having an outer end portion projecting beyond the diameter of said top cover and terminating in a mounting tab; and a snap ring engaged in said annular groove and bearing agaist the outer face of said body plate to detachably secure said bracket in its seated engagement with said top cover.

References Cited in the file of this patent

UNITED STATES PATENTS

| | | |
|---|---|---|
| 1,176,942 | Bliss | Mar. 28, 1916 |
| 1,429,669 | Zimmerman | Sept. 19, 1922 |
| 1,659,094 | Godfrey | Feb. 14, 1928 |
| 1,803,472 | Jahns | May 5, 1931 |